United States Patent [19]
Schaffner et al.

[11] Patent Number: 6,104,908
[45] Date of Patent: Aug. 15, 2000

[54] SYSTEM FOR AND METHOD OF COMBINING SIGNALS OF COMBINING SIGNALS OF DIVERSE MODULATION FORMATS FOR DISTRIBUTION IN MULTIPLE DWELLING UNITS

[75] Inventors: James H. Schaffner, Chatsworth; Gregory L. Tangonan, Oxnard, both of Calif.

[73] Assignee: Hughes Electronics Corporation, El Segundo, Calif.

[21] Appl. No.: 08/807,929

[22] Filed: Feb. 28, 1997

[51] Int. Cl.$^7$ ................ H04H 1/00; H04N 7/10
[52] U.S. Cl. ................ 455/3.2; 348/8; 348/10; 455/6.2
[58] Field of Search ............... 455/3.1, 3.2, 4.1, 455/6.1, 6.3, 6.2, 131; 348/6, 8, 723, 724, 10

[56] References Cited

U.S. PATENT DOCUMENTS

| 3,796,829 | 3/1974 | Gray ................ 178/DIG. 13 |
| 3,833,757 | 9/1974 | Kirk, Jr. et al. ........... 178/5.6 |
| 3,968,327 | 7/1976 | Gregg, III ................ 178/6.8 |

(List continued on next page.)

FOREIGN PATENT DOCUMENTS

| 27 14774 | 10/1978 | European Pat. Off. . |
| 0 730 383 A2 | 9/1996 | European Pat. Off. . |
| 56-47183 | 4/1981 | Japan . |
| 5-129977 | 5/1993 | Japan . |
| 2 288 714 | 10/1995 | United Kingdom . |
| WO 97/01931 | 1/1997 | WIPO . |

OTHER PUBLICATIONS

CellularVision USA, Inc., CV CellularVision 3,333,000 Shares Cellular Vision USA, Inc. Common Stock, Prospectus dated Feb. 8, 1996, pp. 1–43.

Darcie, T.E., "Subcarrier Multiplexing for Lightwave Networks and Video Distribution Systems," *IEEE Journal on Selected Areas in Communications*, 8(7):1240–1248 (Sep., 1990).

European Telecommunication Standard, "Digital broadcasting systems for television, sound and data services; Satellite Master Antenna Television (SMATV) distribution systems," TM 1285 Revision 1, Draft pr ETS 300 473, Nov., 1994, Source: EBU/ETSI JTC, Reference: DE/JTC–DVB–7–1, European Telecommunications Standards Institute, European Broadcasting Union, France, pp. 3–25 (1994).

Maxemchuk et al., "Voice and Data on a CATV Network," *IEEE J. On Selected Areas in Communications*, SAC–3(2):300–311 (Mar., 1985).

(List continued on next page.)

*Primary Examiner*—John W. Miller
*Attorney, Agent, or Firm*—V. D. Duraiswamy; M. W. Sales

[57] ABSTRACT

A system for distributing first and second television signals of diverse modulation formats to a number of locations in a multiple-dwelling unit includes first and second antennas for receiving, at the multiple-dwelling unit, respective first and second received television signals having respective first and second, different modulation formats. The system also includes first and second transmodulators for transmodulating the first and second received television signals, respectively, to develop first and second transmodulated signals, respectively. A combiner or diplexer combines the first and second transmodulated signals into a combined signal, and a distributing network distributes the combined signal to each of a plurality of locations. A diplexer at a particular location selected from the number of locations separates the combined signal to recover the first and second transmodulated signals. A demodulator demodulates the second transmodulated signal recovered by the diplexer to develop a demodulated signal having the second modulation format. At the particular location in the multiple-dwelling unit, either the first transmodulated signal recovered by a separator or the demodulated signal developed by the demodulator is coupled to a television set.

23 Claims, 2 Drawing Sheets

U.S. PATENT DOCUMENTS

| | | | |
|---|---|---|---|
| 4,078,245 | 3/1978 | Johnson et al. | 358/86 |
| 4,183,054 | 1/1980 | Patisaul et al. | 358/86 |
| 4,348,691 | 9/1982 | Mistry | 358/114 |
| 4,450,477 | 5/1984 | Lovett | 358/86 |
| 4,558,464 | 12/1985 | O'Brien, Jr. | 455/4 |
| 4,592,093 | 5/1986 | Ouchi et al. | 455/4 |
| 4,599,647 | 7/1986 | George et al. | 358/122 |
| 4,695,880 | 9/1987 | Johnson et al. | 358/86 |
| 4,709,418 | 11/1987 | Fox et al. | 455/612 |
| 4,710,956 | 12/1987 | Rast | 380/20 |
| 4,747,160 | 5/1988 | Bossard | 455/33 |
| 4,805,014 | 2/1989 | Sahara et al. | 358/86 |
| 4,855,614 | 8/1989 | Maitre | 307/241 |
| 4,901,367 | 2/1990 | Nicholson et al. | 455/5 |
| 4,910,527 | 3/1990 | Dushane et al. | 343/786 |
| 4,916,532 | 4/1990 | Streck et al. | 358/83 |
| 4,930,120 | 5/1990 | Baxter et al. | 370/73 |
| 4,959,862 | 9/1990 | Davidov et al. | 380/10 |
| 4,979,230 | 12/1990 | Marz | 455/3 |
| 5,038,402 | 8/1991 | Pobbins | 455/3 |
| 5,073,930 | 12/1991 | Green et al. | 380/10 |
| 5,077,607 | 12/1991 | Johnson et al. | 358/86 |
| 5,084,903 | 1/1992 | McNamara et al. | 375/18 |
| 5,119,509 | 6/1992 | Kang | 455/328 |
| 5,123,112 | 6/1992 | Choate | 455/56.1 |
| 5,136,411 | 8/1992 | Paik et al. | 359/125 |
| 5,155,591 | 10/1992 | Wachob | 358/86 |
| 5,173,775 | 12/1992 | Walker | 358/141 |
| 5,212,804 | 5/1993 | Choate | 455/33.1 |
| 5,214,501 | 5/1993 | Cavallerano et al. | 358/12 |
| 5,214,787 | 5/1993 | Karkota, Jr. | 455/3.2 |
| 5,220,420 | 6/1993 | Hoarty et al. | 358/86 |
| 5,231,494 | 7/1993 | Wachob | 358/146 |
| 5,243,415 | 9/1993 | Vance | 358/86 |
| 5,249,043 | 9/1993 | Grandmougin | 358/86 |
| 5,257,396 | 10/1993 | Auld et al. | 455/2 |
| 5,272,525 | 12/1993 | Borchardt et al. | 358/83 |
| 5,276,904 | 1/1994 | Mutzig et al. | 455/3.2 |
| 5,293,633 | 3/1994 | Robbins | 455/3.1 |
| 5,345,591 | 9/1994 | Tsurumaki et al. | 455/3.2 |
| 5,345,594 | 9/1994 | Tsuda | 455/18 |
| 5,375,146 | 12/1994 | Chalmers | 375/103 |
| 5,394,559 | 2/1995 | Hemmie et al. | 455/5.1 |
| 5,412,416 | 5/1995 | Nemirofsky | 348/10 |
| 5,412,720 | 5/1995 | Hoarty | 380/15 |
| 5,446,490 | 8/1995 | Blahut et al. | 348/7 |
| 5,459,749 | 10/1995 | Park | 375/286 |
| 5,477,199 | 12/1995 | Montreuil | 332/103 |
| 5,483,663 | 1/1996 | Tawil | 455/3.2 |
| 5,483,686 | 1/1996 | Saka et al. | 455/182.2 |
| 5,497,401 | 3/1996 | Ramaswamy et al. | 375/341 |
| 5,504,816 | 4/1996 | Hamilton et al. | 380/20 |
| 5,572,517 | 11/1996 | Safadi | 370/50 |
| 5,760,819 | 6/1998 | Sklar et al. | 348/8 |
| 5,787,335 | 7/1998 | Novak | 455/3.2 |
| 5,790,175 | 8/1998 | Sklar et al. | 348/8 |

OTHER PUBLICATIONS

Olshansky et al., "Subcarrier Multiplexed Coherent Lightwave Systems for Video Distribution," *IEEE Journal on Selected Areas in Communications,* 8(7):1268–1275 (Sep., 1990).

Schwartz, M., Information Transmission, Modulation, and Noise, Fourth Edition, McGraw–Hill Publishing Company pp. 497–523.

Terry, J., "Alternative Technologies and Delivery Systems for Broadband ISDN Access: Rapid deployment of B–ISDN depends upon collaboration among potential transport, delivery, and service providers–especially for on–demand video," *IEEE Communications Magazine,* pp. 58–64 (Aug., 1992).

SYSTEM FOR AND METHOD OF COMBINING SIGNALS OF COMBINING SIGNALS OF DIVERSE MODULATION FORMATS FOR DISTRIBUTION IN MULTIPLE DWELLING UNITS

BACKGROUND OF THE INVENTION (a) Field of the Invention

The present invention relates generally to television signal distribution and, more particularly, to methods and systems for combining signals of diverse modulation formats, such as broad-area signals that are broadcast via satellite in one modulation format and local signals that are broadcast terrestrially or via cable in another, different modulation format.

(b) Description of Related Art

Satellite television broadcasting systems typically deliver a large number of television programming channels to system subscribers. Because these channels are broadcast from a centralized distribution location, however, satellite television broadcasting systems generally do not include regional or local television broadcasts (e.g., local newscasts, sportscasts, and weather forecasts) in the broadcasted satellite television signals which are received by a multitude of regions or localities throughout a larger distribution area, such as the entire North American continent. Consequently, off-air or community access television (CATV) distribution networks, which are separate from the satellite distribution network, are often used to deliver the regional or local television broadcasts to individual subscribers in the various regions or localities. The need to provide a separate distribution system for local television can be problematic in multiple-dwelling unit (MDU) buildings, such as apartment buildings and office buildings, where the cost of installing and maintaining a local channel distribution system separate from the satellite broadcast distribution system is especially high.

Moreover, local channel distribution architectures, such as those that are commonly present in typical MDU's, route local television channel signals through cables and amplifiers characterized by significant RF losses, distortion, and other noise to which local off-air and CATV broadcasts (which are typically amplitude-modulated or AM signals) are particularly sensitive.

Further, in a multiple-dwelling environment, there is a practical limit on the number of satellite receiving antennas and local broadcast receiving antennas that may be placed on or about the multiple-dwelling unit. Accordingly, it is generally not practical for the occupant of each dwelling in a multiple-dwelling unit to install satellite and local receiving antennas, so an alternative, shared antenna system would be beneficial for reasons of aesthetics as well as cost.

SUMMARY OF THE INVENTION

The present invention provides a system for, and a method of, combining satellite-based and other signals of diverse modulation formats for use in merging local television channels with satellite broadcast television channels in a manner that overcomes the foregoing limitations of prior distribution systems. Specifically, the present invention converts amplitude-modulated off-air and CATV broadcast channels to another (i.e., non-AM) modulation format that is less susceptible to noise and distortion (cross-channel interference) than the original amplitude-modulated off-air or CATV signal. Consequently, the present invention provides highly robust multiplexing and routing of the converted local channel signals through the MDU distribution network.

More particularly, the present invention relates to a system for distributing first and second television signals of diverse modulation formats to a plurality of locations in a multiple-dwelling unit. The system includes first and second receiving means for receiving, at the multiple-dwelling unit, first and second received television signals having respective first and second, different modulation formats. This system also includes first and second transmodulating means for transmodulating the first and second received television signals, respectively, to develop respective first and second transmodulated signals. Further, the system includes combining means for combining the first and second transmodulated signals into a combined signal and distributing means for distributing the combined signal to each of a plurality of locations in the multiple-dwelling unit. At a particular location selected from the plurality of locations in the multiple-dwelling unit, separating means is provided for separating the combined signal to recover the first and second transmodulated signals, and demodulating means is provided for demodulating the second transmodulated signal to develop a demodulated signal having the second modulation format. The system additionally includes coupling means adapted for connection to a television set for coupling the first transmodulated signal and/or the demodulated signal to a television set at the particular location in the multiple-dwelling unit.

Preferably, the first receiving means comprises a satellite signal receiving antenna for receiving, from a satellite, a television signal having a quaternary phase shift key (QPSK) modulation format, and the second receiving means is a VHF/UHF antenna for receiving an amplitude-modulated (AM) television signal. Also, preferably, the first transmodulating means converts the first received QPSK television signal to a first transmodulated signal having a first modulation format such as quadrature amplitude modulation (QAM), and the second transmodulating means converts the second received television signal to a second transmodulated signal having a second modulation format such as frequency modulation (FM), frequency-shift key (FSK) modulation, or phase-shift key (PSK) modulation.

The combining means may be a diplexer or a combiner for multiplexing the first and second transmodulated signals together. The distributing means may be a distribution system or network, whether wireless or wire-based, for distributing the combined signal to the plurality of locations in a multiple-dwelling unit, and the separating means preferably comprises a diplexer for diplexing the combined signal to recover the first and second transmodulated signals. The demodulating means may comprise a demodulator in combination with a decoder for developing, from the second transmodulated signal, a demodulated signal having the second modulation format, or it may simply comprise a frequency modulated satellite video signal tuner.

The present invention also relates to a method of distributing first and second television signals of diverse modulation formats to a plurality of locations in a multiple-dwelling unit.

More particularly, the method of the present invention includes the steps of receiving, at a multiple-dwelling unit, a first received television signal having a first modulation format; transmodulating the first received television signal to develop a first transmodulated signal; receiving, at the multiple-dwelling unit, a second received television signal having a second modulation format different than the first modulation format; transmodulating the second received television signal to develop a second transmodulated signal; and combining the first and second transmodulated signals into a combined signal. The method further includes the steps of distributing the combined signal to each of a plurality of locations, such as various dwellings in a multiple-dwelling unit, and separating the combined signal to recover, at a particular location selected from the plurality of locations, the first and second transmodulated signals. Still further, the method includes the steps of demodulating the second transmodulated signal to develop a demodulated signal having the second modulation format and providing for coupling to a television set at the particular location, either the first transmodulated signal or the demodulated signal.

DESCRIPTION OF THE PREFERRED EMBODIMENTS

Figure 1:
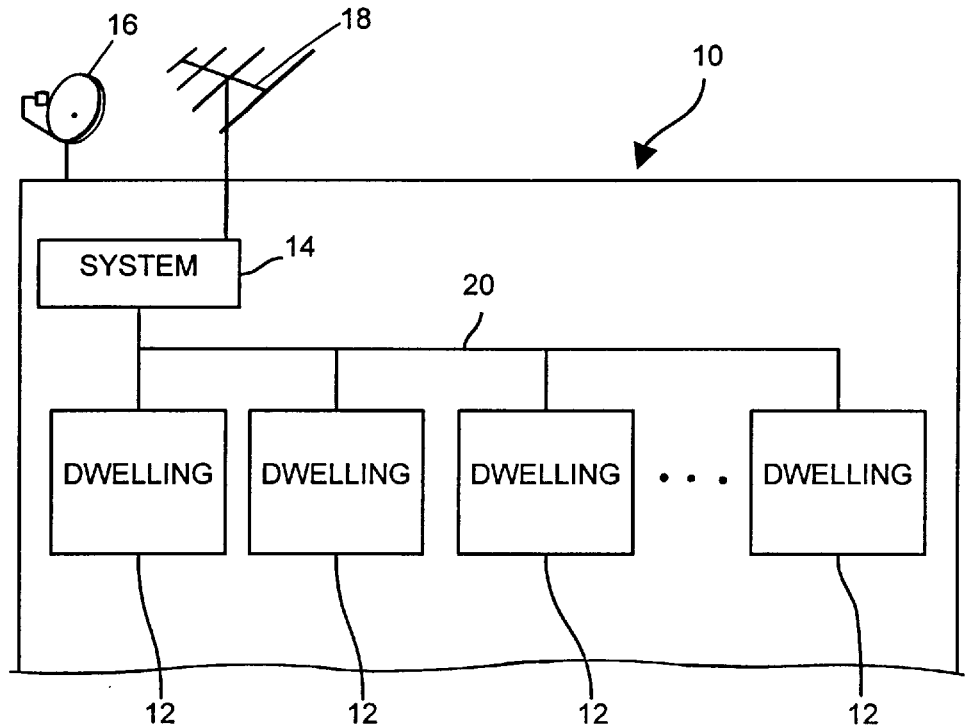
FIG. 1 is a generalized block diagram illustrating an environment in which the present invention can be used.

As illustrated in FIG. 1, a multiple-dwelling unit 10 has a plurality of dwellings 12 and a system 14 for providing television channel signals to each of the dwellings 12. In particular, as described below in detail, the system 14 provides to the dwellings 12 both satellite broadcast television signals received by a satellite signal receiving antenna 16 or other suitable receiving means and terrestrially broadcast (i.e., air-based or wire-based) television signals received by a VHF/UHF antenna 18 or other suitable receiving means. These signals are provided to the dwellings 12 by means of a distribution network 20, which interconnects the system 14 with each of the dwellings 12 of the multiple-dwelling unit 10.

Figure 2:
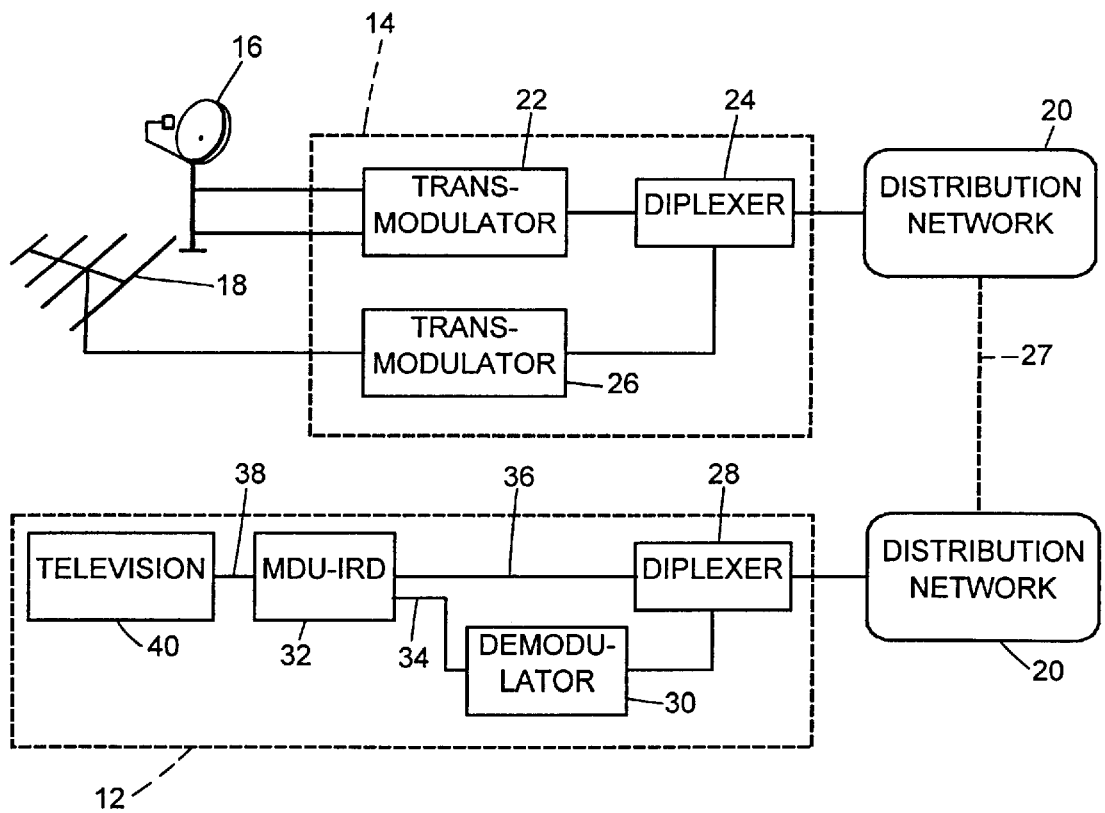
FIG. 2 is a block diagram of a system according to the present invention.

More particularly, the system 14 may include an optional transmodulator 22, as shown in FIG. 2, for transmodulating a television signal received by the satellite signal receiving antenna 16 to develop a first transmodulated signal therefrom. Specifically, the satellite signal receiving antenna 16 is adapted for receiving a signal comprising a sizable number (e.g., 100–200) of satellite broadcast television channels and having a quaternary phase shift key (QPSK) modulation format. The transmodulator 22 develops a first transmodulated signal (a QAM signal) having a quadrature amplitude modulated or QAM modulation format from the QPSK signal received by the satellite signal receiving antenna 16. The QAM signal is provided to a diplexer 24 or other suitable combining means so that the QAM signal containing the satellite broadcast television channels can be multiplexed together with a signal containing local television channels as described below in detail.

Just as the satellite signal receiving antenna 16 is adapted for receiving a satellite broadcast television signal, the VHF/UHF antenna 18 is adapted for receiving channels including a selected set of local channels comprising a much smaller number (e.g., 5–8) of amplitude-modulated, terrestrially broadcast television channel signals from local or regional television broadcasters. of course, the VHF/UHF antenna 18 can be replaced by a connection to a local cable provider or any other suitable source for local television channel signals. A transmodulator 26 transmodulates the amplitude-modulated local television channel signals received by the VHF/UHF antenna 18 to develop a second transmodulated signal having a modulation format such as frequency modulation (FM), frequency shift key (FSK) modulation, or phase shift key (PSK) modulation. As will be recognized by those of ordinary skill in the art, either the transmodulator 26 must be disposed sufficiently close to the antenna 18 to ensure that the fidelity of the local channel signal is not degraded before transmodulation or, alternatively, suitable amplification must be provided between the antenna 18 and the transmodulator 26 to compensate for the signal degradation in the second received television signal. The second transmodulated signal is provided to the diplexer 24, which multiplexes that signal together with the QAM signal developed by the transmodulator 22 to produce a combined or diplexed signal which includes both the satellite broadcast television channel signals and the terrestrially broadcast television channel signals.

The combined signal is then distributed to each of the plurality of locations or dwellings 12 in the multiple-dwelling unit 10 via the distribution network 20. As indicated by the dashed line 27 in FIG. 2, the distribution network 20 may comprise a wire-based distribution system, as is now common in many multiple-dwelling units 10, or it may comprise a wireless or air-based distribution system. In either case, the distribution network 20 communicates the combined signal to the various dwellings 12 of the multiple-dwelling unit 10 without substantially altering or degrading the electrical characteristics, such as the carrier-to-noise ratio, for example, of the combined signal.

In each dwelling 12 of the multiple-dwelling unit 10 that receives the combined signal from the distributing means 20, a diplexer 28 or other suitable separating means is provided for separating the combined signal to separately recover from the combined signal each of the first and second transmodulated signals, which were diplexed together by the diplexer 24 to form the combined signal as described above. Thus recovered, the second transmodulated signal, which contains the selected set of local television channels, is then coupled to a demodulator 30 such as a satellite FM video tuner or any other suitable demodulating means for demodulating the second transmodulated signal to develop a demodulated, tuned signal having the second modulation format described above (i.e., the modulation format in which the locally broadcast television channel signals were originally received by the VHF/UHF antenna 18), but containing only one of the local channels in the selected set.

The demodulated signal, in turn, is coupled to a multiple-dwelling unit integrated receiver/decoder or MDU-IRD 32. The MDU-IRD 32 is a special type of integrated receiver/decoder (IRD), a device employed in a digital satellite system to receive a broadcast television signal and permit a user to view a particular television channel included in the broadcast television signal. More particularly, the MDU-IRD 32 is specially designed for use in a satellite television system in multiple-dwelling units 10.

While the MDU-IRD 32 permits a user to tune in a desired one of the satellite broadcast television channels, the MDU-IRD 32 simply passes the demodulated local channel signal directly to the television set 40. In other words, the tuning of a desired local channel is performed by the demodulator 30 and the demodulated signal is simply passed directly through the MDU-IRD 32 unchanged. If desired, however, an alternative demodulator could be provided which is capable of simultaneously demodulating all of the local channels so that the MDU-IRD 32 could be used to tune a desired local channel from the demodulated signal in the same way that it tunes a desired satellite broadcast television channel from the second transmodulated signal recovered by the diplexer 28.

In addition, if the local television channel signals are digitized in an FSK or PSK modulation format, then the demodulator 30 must be provided with means for decoding the local television channel signals as well as means for tuning in to a particular one of those channels. Of course, the functionality of the local channel demodulator 30 (with or without a decoding capability) could be integrated into the MDU-IRD 32, if desired.

An MDU-IRD 32 differs from a conventional IRD in that it is adapted for receiving satellite broadcast television signals that have been transmodulated from the standard QPSK modulation format into another modulation format such as quadrature amplitude modulation or QAM. The MDU-IRD 32 has an input 34 for receiving the demodulated signal output by the demodulator 30 and an input 36 for receiving the first transmodulated signal recovered by the diplexer 28. The MDU-IRD 32 also includes an output 38 adapted for connection to a television set 40 for selectively providing a particular television channel selected by a user (and thus tuned by the MDU-IRD 32 from one of the first transmodulated signal recovered by the diplexer 28 and the demodulated signal developed by the demodulator 30) to the television set 40. Thus, the MDU-IRD 32 provides users with an apparently seamless choice of television channels from both the local and satellite television broadcasts.

Figure 3:
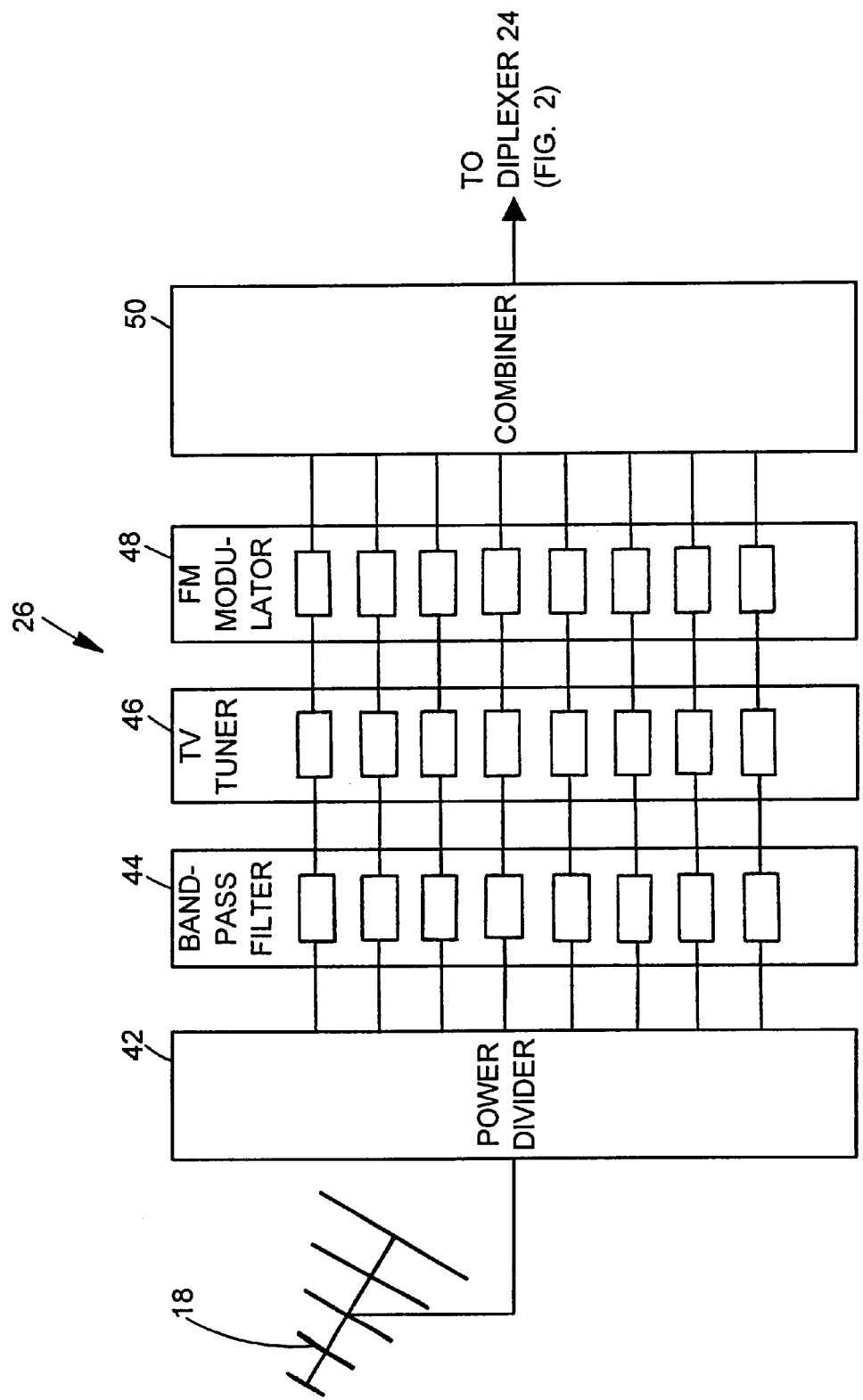
FIG. 3 is a block diagram of the VHF/UHF transmodulator depicted in FIG. 2.

The transmodulator 26, which transmodulates the locally broadcast television channel signals as noted above, is illustrated diagrammatically in greater detail in FIG. 3. As shown in FIG. 3, local television channel signals received by the VHF/UHF antenna 18 are passed first to a power divider or splitter 42 of the transmodulator 26. The power divider 42 splits the received television signal into a number of transmission paths corresponding to the number of channels in the selected set of local channels. The exemplary transmodulator 26 shown in FIG. 3 provides for eight local channels, but any other desired number of local channels could alternatively be provided in accordance with user demand and available bandwidth in the television signal distribution system of a given multiple-dwelling unit 10.

Each transmission path corresponds to one of the selected local channels available to the user and includes a band-pass filter 44, a TV tuner 46, and an FM modulator 48. The band-pass filter 44 of each transmission path produces a filtered signal containing only the frequency band of the local channel corresponding to the transmission path. The filtered signal is coupled to the TV tuner 46 of the transmission path, and the TV tuner 46 demodulates the filtered signal to produce a 6 MHz baseband video signal. In practice, the band-pass filter 44 and the TV tuner 46 for each transmission path may be combined in a single circuit.

The FM modulator 48 of each transmission path then converts each baseband video signal to a frequency modulated or FM signal, and the FM signals of each of the transmission paths are frequency division multiplexed together by a combiner 50 and then sent to the diplexer 24 (FIG. 2).

Optionally, a digital video encoder (not shown) can be coupled between the TV tuner 46 and the FM modulator 48 in each transmission path, to employ frequency shift key (FSK) modulation. Alternatively, each FM modulator 48 can be replaced by a combination of a video encoder (not shown) and a phase shift key or PSK modulator (not shown) to employ PSK modulation. While the latter embodiment would likely be significantly more expensive to construct than the frequency-modulation embodiment described above, it will be evident to those skilled in the art that a digital (PSK) transmodulator would permit the use of more aggressive video compression techniques which would permit more television channels to be accommodated in a given bandwidth.

While the present invention has been described herein with reference to specific examples, those examples are intended to be illustrative only, and are not to be deemed to limit the scope of the invention. To the contrary, it will be apparent to those of ordinary skill in the art that many changes, additions and/or deletions may be made to the disclosed embodiments without departing from the scope and spirit of the invention.

What is claimed is:

1. A system for distributing first and second television signals of diverse modulation formats to a plurality of locations in a multiple-dwelling unit, comprising:

first receiving means for receiving at the multiple-dwelling unit a first received television signal having a first modulation format;

second receiving means for receiving at the multiple-dwelling unit a second received television signal having a second modulation format different than the first modulation format;

first transmodulating means converting the modulation format of the second received television signal into a third modulation format, the second received television signal having the third modulation format referred to as a first transmodulated signal;

combining means for combining the first received television signal and the first transmodulated signal into a combined signal;

distributing means for distributing the combined signal to each of a plurality of locations;

separating means at a particular location selected from the plurality of locations for separating the combined signal to recover the first received television signal and the first transmodulated signal;

demodulating means for demodulating the first transmodulated signal recovered by the separating means to develop a demodulated signal having the second modulation format; and coupling means adapted for connection to a television set for coupling to a television set at the particular location, one of the first received television signal recovered by the separating means and the demodulated signal developed by the demodulating means.

2. The system of claim 1, wherein the first receiving means comprises a satellite signal receiving antenna and wherein the first received television signal is received from a satellite.

3. The system of claim 2, wherein the first received television signal is quadrature phase shift key modulated in format.

4. The system of claim 3, further comprising a second transmodulating means converting the modulation format of the first received television into a fourth modulation format before the first received television signal is combined by the combining means with the first transmodulated signal.

5. The system of claim 4, wherein the second transmodulating means converts the first received television signal into a quadrature amplitude modulation format.

6. The system of claim 1, wherein the second receiving means is a VHF/UHF antenna.

7. The system of claim 6, wherein the second received television signal is amplitude-modulated.

8. The system of claim 7, wherein the first transmodulating means converts the second received television signal to a second transmodulated signal having a modulation format selected from the group consisting of frequency modulation, frequency-shift key modulation, and phase-shift key modulation.

9. The system of claim 1, wherein the combining means comprises a diplexer for multiplexing the first received television signal and the first transmodulated signal together.

10. The system of claim 1, wherein the combining means comprises a combiner for multiplexing the first received television signal and the first transmodulated signal together.

11. The system of claim 1, wherein the distributing means comprises a wireless distribution system for distributing the combined signal to the plurality of locations in a multiple-dwelling unit.

12. The system of claim 1, wherein the distributing means comprises a wire-based distribution system for distributing the combined signal to the plurality of locations in a multiple-dwelling unit.

13. The system of claim 1, wherein the separating means comprises a diplexer for diplexing the combined signal to recover the first received television signal and the first transmodulated signal.

14. The system of claim 1, wherein the demodulating means comprises a demodulator and a decoder for developing a demodulated signal having the second modulation format from the first transmodulated signal.

15. The system of claim 1, wherein the demodulating means comprises a frequency modulated satellite video signal tuner.

16. The system of claim 1, wherein the demodulating means comprises a frequency-shift-key demodulator.

17. The system of claim 1, wherein the demodulating means comprises a phase-shift-key demodulator.

18. The system of claim 1, wherein the first transmodulating means includes a tuner and an FM modulator for tuning a predetermined television channel.

19. A system for distributing first and second television signals of diverse modulation formats to a plurality of locations in a multiple-dwelling unit, comprising:
a satellite signal receiving antenna at the multiple-dwelling unit capable of receiving a first television signal having a first modulation format;
a UHF/VHF signal receiving antenna at the multiple-dwelling unit capable of receiving a second television signal having a second modulation format different than the first modulation format;
a transmodulator coupled to the UHF/VHF signal receiving antenna and capable of developing a first transmodulated signal from the second television signal;
a first diplexer capable of combining the first television signal and the first transmodulated signal into a combined signal;
a second diplexer at a particular location selected from the plurality of locations and capable of separating the combined signal to recover the first television signal and the first transmodulated signal;
a distribution network coupled between the first and second diplexers;
a demodulator coupled to the second diplexer and capable of demodulating the first transmodulated signal recovered by the second diplexer to develop a demodulated signal having the second modulation format; and
a coupler connected to the second diplexer and the demodulator and having a television signal output adapted for connection to a television set.

20. A method of distributing first and second television signals of diverse modulation formats to a plurality of locations in a multiple-dwelling unit, the method comprising the steps of:
receiving at the multiple-dwelling unit a first received television signal having a first modulation format;
receiving at the multiple-dwelling unit a second received television signal having a second modulation format different than the first modulation format;
transmodulating the second received television signal to develop a first transmodulated signal;
combining the first received television signal and the first transmodulated signal into a combined signal;
distributing the combined signal to each of a plurality of locations;
separating the combined signal to recover, at a particular location selected from the plurality of locations, the first received television signal and the first transmodulated signal;
demodulating the first transmodulated signal recovered by the separating means to develop a demodulated signal having the second modulation format; and
providing for coupling to a television set at the particular location, one of the first received television signal recovered by the separating means and the demodulated signal developed by the demodulating means.

21. The method of claim 20, further comprising the step of transmodulating the first received television signal before the combining step so that the first television signal has a modulation format different than the first modulation format.

22. An apparatus for combining first and second television signals having different modulation formats, comprising:
a first antenna for receiving a first television signal having a first modulation format;
a second antenna for receiving a second television signal having a second modulation format;
a transmodulator receiving a signal from the first antenna, said transmodulator converting the first television signal from the first modulation format to a third format; and
a diplexer receiving signals from the second antenna and the transmodulator, the diplexer combining the signals from the second antenna and the transmodulator into a combined signal.

23. An apparatus for receiving a combined signal that is a combination of a first signal and a second signal, wherein the first signal has a first modulation format and the second signal has a second modulation format, comprising:
a diplexer for receiving the combined signal and separating and separating the combined signal into the first signal and the second signal;
a demodulator for converting the first signal having a first modulation format into a first signal having a third modulation format; and
an MDU-IRD receiving the first signal having the third modulation format from the demodulator and the second signal having the second modulation format from the diplexer, the MDU-IRD processing the first signal having the third modulation format and the second signal having the second modulation format to create a signal for display on a television.

* * * * *